United States Patent [19]

Schnathorst

[11] Patent Number: 4,523,277
[45] Date of Patent: Jun. 11, 1985

[54] PRIORITY INTERRUPT SYSTEM FOR MICROCOMPUTER

[75] Inventor: Vernon K. Schnathorst, Monument, Colo.

[73] Assignee: NCR Corporation, Dayton, Ohio

[21] Appl. No.: 429,580

[22] Filed: Sep. 30, 1982

[51] Int. Cl.³ .......................... G06F 9/46; G06F 9/32; G06F 9/42

[52] U.S. Cl. .................................................. 364/200

[58] Field of Search ... 364/200 MS File, 900 MS File

[56] References Cited

U.S. PATENT DOCUMENTS

| | | | |
|---|---|---|---|
| 3,665,415 | 5/1972 | Beard et al. | 340/172.5 |
| 3,999,165 | 12/1976 | Kita et al. | 340/172.5 |
| 4,035,780 | 7/1977 | Kristick et al. | 364/900 |
| 4,090,238 | 5/1978 | Russo | 364/200 |
| 4,129,901 | 12/1978 | Masuda | 364/104 |
| 4,152,761 | 5/1979 | Louie | 364/200 |
| 4,200,912 | 4/1980 | Harrington et al. | 364/200 |
| 4,237,535 | 12/1980 | Wiedenman | 364/200 |
| 4,315,314 | 2/1982 | Russo | 364/200 |

OTHER PUBLICATIONS

Martha E. Sloan, *Computer Hardware and Organization: An Introduction*, (Science Research Associated, Inc., 1976), pp. 378–386.

*Intel 8080 Microcomputer Systems User's Manual*, (Intel Corp., Sep. 1975), pp. 1-4, 2-11, 5-173, 5-174, 5-153 to 5-162.

*Primary Examiner*—James D. Thomas
*Assistant Examiner*—Thomas Lee
*Attorney, Agent, or Firm*—J. T. Cavender; Casimer K. Salys

[57] ABSTRACT

A high speed priority interrupt system which permits a microcomputer to service a plurality of peripheral units on a priority basis is provided. Interrupt address jump vectors corresponding to the routines for servicing the peripheral devices are stored in a read only memory and are selectively transferred to a program counter in accordance with a predetermined priority basis to allow the microcomputer to interrupt its program and service one or more peripheral devices requesting access to the microcomputer. The interrupt system minimizes the time required by the microcomputer for interruption of the current program, servicing of the peripheral units, and resumption of the interrupted program.

3 Claims, 4 Drawing Figures

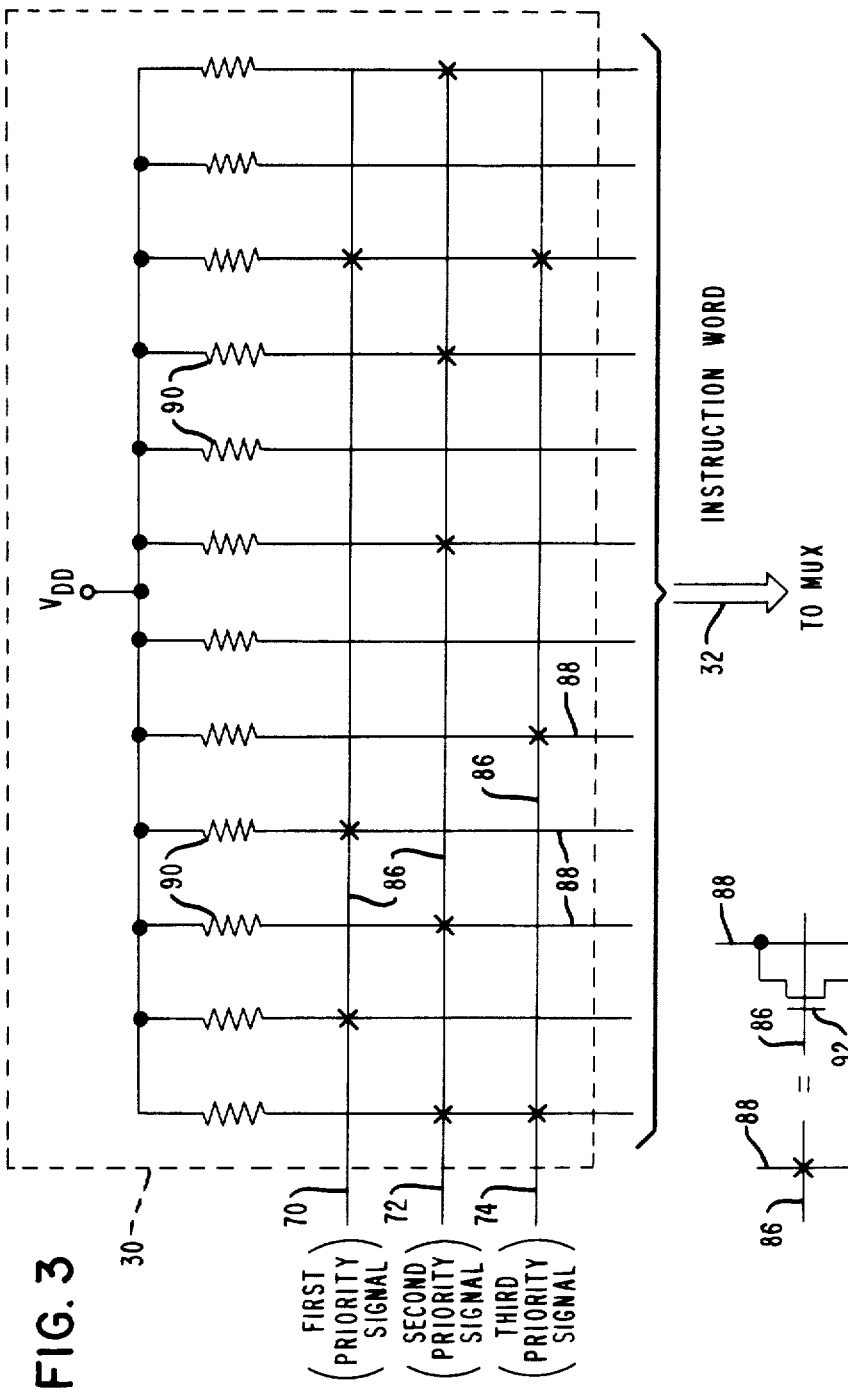

PRIORITY INTERRUPT SYSTEM FOR MICROCOMPUTER

FIELD OF INVENTION

The present invention relates to an interrupt system for a computer and, more particularly, to a high speed interrupt system which permits a microcomputer to service a plurality of peripheral units on a priority basis. Specifically, the invention concerns a high speed interrupt system for a microcomputer in which interrupt address jump vectors corresponding to the routines for servicing the peripheral devices are stored in a read only memory and selectively transferred to a program counter on a predetermined priority basis to allow the microcomputer to interrupt its program and service one or more peripheral devices requesting access to the microcomputer.

SUMMARY OF INVENTION

In the operation of a data processing system adapted to service a plurality of peripheral devices, e.g., keyboards, displays, sensors and other input/output devices, it is necessary to design a system capable of servicing the peripheral devices in an efficient . manner to achieve optimum performance of the assigned tasks with minimal effect on the overall efficiency of the system. Thus, it is advantageous to utilize a servicing technique which minimizes the delay in computer operations required by the servicing of peripheral devices.

A previous technique used in data processing systems for servicing peripheral devices, known as the "polled method", requires the computer to perform a polling routine to examine each peripheral device sequentially to determine whether servicing is required. A relatively large amount of time is required for the computer to perform the necessary polling routine which has the effect of reducing the efficiency and cost effectiveness of the computer operations. Another technique, known as the "interrupt method" eliminates the need for a polling routine to be performed and instead interrupts the current program being performed by the computer only when a peripheral device requests service. In response to an interrupt request signal from a peripheral device, the current program is interrupted to allow the computer to perform a service routine for the peripheral device. Typically, the computer memory stores vectors corresponding to the service routines for the peripheral devices. Upon occurrence of an interrupt request signal, the present contents of the program counter is pointed toward the location of the corresponding vector in the computer memory which is loaded into the program counter. Thereafter, the corresponding service routine is initiated and performed by the computer for the peripheral device. This technique also involves a significant time delay because the interrupt vector is not immediately applied to the program counter in response to the interrupt request signal.

A primary object of the present invention is to provide a high speed interrupt system which enables a computer to efficiently service a plurality of peripheral devices.

It is also an object of the invention to provide a high speed priority interrupt system for a microcomputer which permits the program performed by the microcomputer to be interrupted for servicing of peripheral devices requesting access to the computer on a predetermined priority basis.

Another object of the invention is to provide a priority interrupt system for a microcomputer which minimizes the time required by the microcomputer to perform the interruption of the current program, the servicing of the peripheral units, and the resumption of the interrupted program.

A further object of the invention is to provide a high speed interrupt system for a microcomputer in which the interrupt address jump vectors corresponding to the routines for servicing the peripheral devices are stored in a read only memory and are available for immediate transfer into a program counter upon occurrence of an interrupt request signal to direct the microcomputer to immediately service the peripheral unit.

The present invention is embodied in an interrupt system for a computer servicing a plurality of peripheral devices comprising program counter means for recording the status of the current program being performed by the computer, read only memory means for storing interrupt address jump vectors corresponding to the routines for servicing the peripheral devices, control means responsive to interrupt request signals from the peripheral devices for transferring the contents of the program counter means into the computer memory upon occurrence of an interrupt signal, and means for loading the interrupt address jump vectors from the read only memory means into the program counter means to allow the computer to service a peripheral device requesting access to the computer. Preferably, the interrupt system includes means for establishing a predetermined priority basis for selection of the interrupt address jump vectors to be loaded into the program counter means in response to the interrupt request signals from the peripheral devices. The provision of read only memory means which is programmable to store the interrupt address jump vectors for direct loading into the program counter means advantageously permits a high speed response to the interrupt request signals from the peripheral devices.

A preferred embodiment of the invention is embodied as a priority interrupt system for a microcomputer servicing a plurality of peripheral devices on a predetermined priority basis. The system comprises program counter means for counting the steps of the current program being performed by the microcomputer, input means for receiving interrupt request signals from the peripheral devices indicating requests for access to the microcomputer, read only memory means for storing . interrupt address jump vectors corresponding to the routines for servicing the peripheral devices, priority encoder means responsive to the input means for producing priority signals to select interrupt address jump vectors from the read only memory means in accordance with a predetermined priority basis in response to the interrupt request signals from the peripheral devices, control means responsive to the input means for transferring the contents of the program counter means into. the microcomputer memory upon occurrence of an interrupt signal, and means responsive to the control means for loading the interrupt address jump vectors from the memory means into the program counter means to allow the microcomputer to immediately service the peripheral device requesting access to the computer. Preferably, the read only memory is capable of storing a number of binary words defining the interrupt address jump vectors for the peripheral devices, with each word being equal in its number of bits to the program counter length. This allows interrupt routines to be stored anywhere in program memory. The read only memory preferably consists of a portion of an integrated circuit chip which includes the program memory of the microcomputer.

BRIEF DESCRIPTION OF DRAWINGS

The accompanying drawings illustrate a preferred embodiment of the invention and together with the description serve to explain the principles and operation of the invention. In the drawings:

FIG. 3 is a detailed circuit diagram of a read only memory utilized in the interrupt system of FIG. 1 to store interrupt address jump vectors corresponding to the service routines required to service the peripheral units; and FIG. 4 is a schematic diagram illustrating the format used to program the read only memory bits of FIG. 3.

DETAILED DESCRIPTION OF PREFERRED EMBODIMENT

Figure 1:
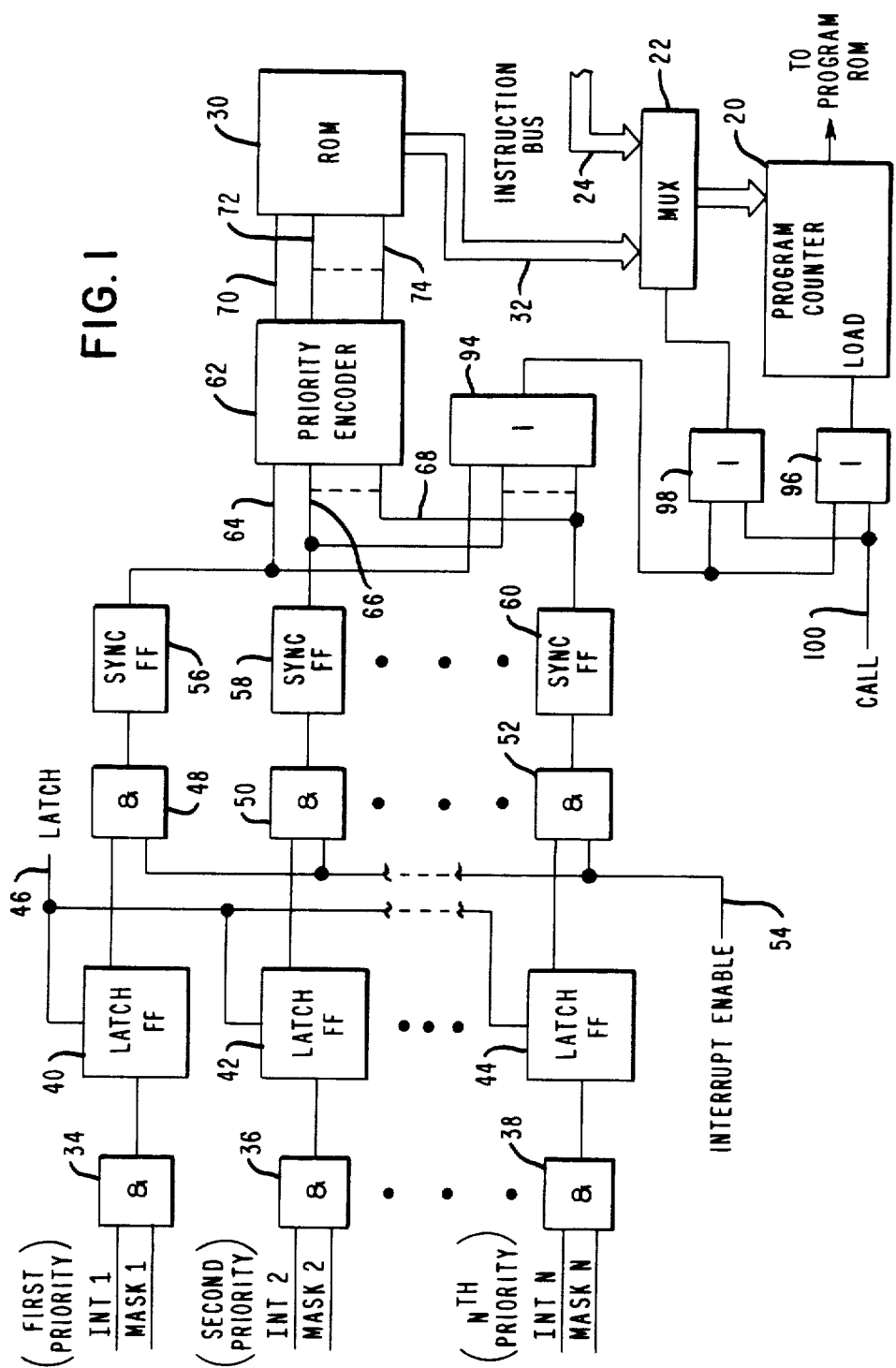
FIG. 1 is a block diagram illustrating a priority interrupt system constructed in accordance with the invention for use in a microcomputer servicing a plurality of peripheral devices.

Referring to FIG. 1, there is shown a priority interrupt system adapted for use with a microcomputer to provide for the servicing of a plurality of peripheral devices (not shown) on a predetermined priority basis. The interrupt system includes a program counter 20 which is normally coupled by a multiplex (MUX) unit 22 to an instruction bus 24 of the microcomputer. The function of program counter 20 is to sequentially step through the addresses of the instructions to be executed, which addresses and instructions relate to a separate program ROM (not shown) within the microcomputer. The interrupt system also includes a read only memory (ROM) 30 which stores interrupt address jump vectors corresponding to the routines performed by the microcomputer for servicing the peripheral devices. The output of read only memory 30 is applied via a connector bus 32 to multiplex unit 22 which selectively loads the interrupt address jump vectors from the read only memory into program counter 20 in response to interrupt request signals from the peripheral devices. The output of program counter 20 is an address applied to a program ROM (not shown) in which the instructions for the program of the microcomputer are stored.

For purposes of illustration, an embodiment of the interrupt system for enabling the computer to service three peripheral devices is illustrated and described. However, it will be understood by persons skilled in the art that a larger number of peripheral devices can be serviced by the microcomputer.

As shown in FIG. 1, the input circuitry of the interrupt system includes a plurality of input AND gates 34, 36 and 38 which correspond to the peripheral devices serviced by the microcomputer. Each AND gate is provided with a first input for receiving interrupt request signals, designated INT 1, INT 2 and INT N, respectively, from the peripheral devices. In addition, each AND gate includes a second input for receiving masking signals, designated MASK 1, MASK 2 and MASK N, respectively, from a masking register (not shown) which may be employed by the programmer to enable or disable selected interrupt requests from the peripheral devices. The outputs of AND gates 34, 36 and 38 are coupled to a set of flip-flops 40, 42 and 44, respectively, which are provided with a common latch input 46. Preferably, flip-flops 40, 42 and 44 are edge triggered to respond to the voltage transitions which occur at the outputs of AND gates 34, 36 and 38 in response to the asynchronous peripheral request signals initiated by the peripheral devices. Latch input 46 provides for latching of flip-flops 40, 42 and 44 to preserve the current state of the signals stored in the flip-flops and to preclude further response of the flip-flops to subsequent interrupt request signals until the current interrupt requests are serviced in a predetermined sequence.

In addition, the input circuitry of the interrupt system includes a set of AND gates 48, 50 and 52 each having a first input coupled to the output of flip-flops 40, 42 and 44, respectively, and a second input 54 responsive to an interrupt enable signal which permits the programmer to selectively enable and disable the priority interrupt system. The outputs of AND gates 48, 50 and 52 are coupled to a set of synchronizing flip-flops 56, 58 and 60, respectively, which are synchronized with the clock of the microcomputer. Synchronizing flip-flops 56, 58 and 60 ensure that the asynchronous signals generated by AND gates 48, 50 and 52 are coupled to priority encoder 62 as a single set of bit data on input lines 64, 66 and 68.

Referring further to FIG. 1, the interrupt system includes a priority encoder 62 which responds to the interrupt request signals from the peripheral devices via the input circuitry and produces priority signals to select interrupt address jump vectors from read only memory 30 in accordance with a predetermined priority basis for transfer to program counter 20. Priority encoder 62 includes a plurality of inputs 64, 66 and 68 coupled to the outputs of synchronizing flip-flops 56, 58 and 60, respectively, and a corresponding number of outputs 70, 72 and 74 coupled to the inputs of read only memory 30.

Figure 2:
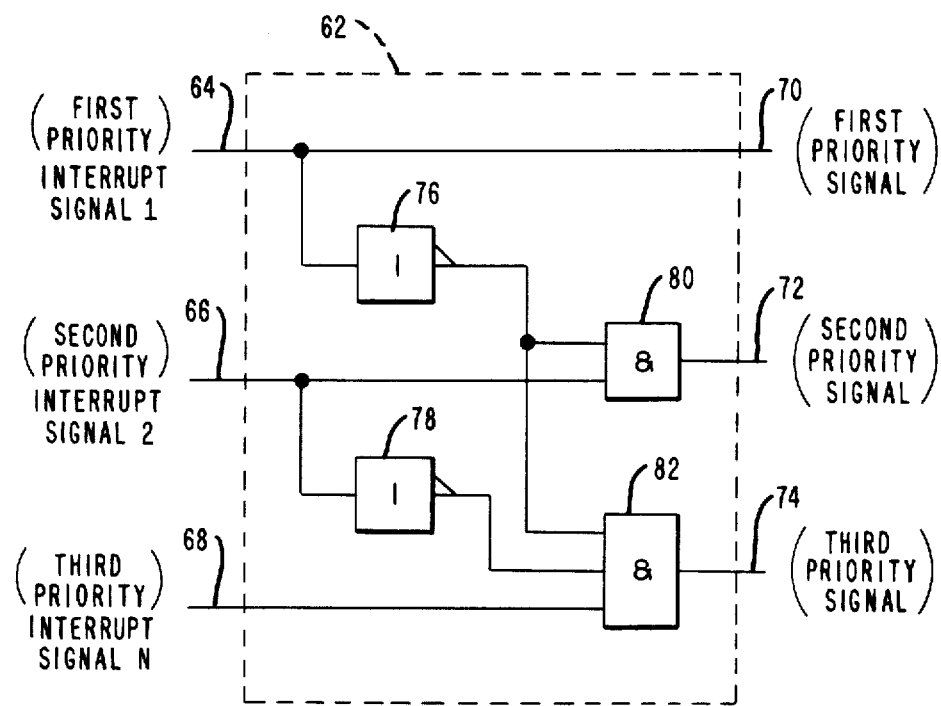
FIG. 2 is a detailed view of a priority encoder circuit utilized in the interrupt system of FIG. 1.

As shown in FIG. 2, the interrupt request signal at encoder input 64 is coupled directly to output 70 to provide a first priority signal. Priority encoder 62 includes a pair of inverters 76 and 78 coupled to encoder inputs 64 and 66, respectively, which invert the interrupt request signals applied to these inputs. The priority encoder also includes a first AND gate 80 responsive to the inverted interrupt request signal from input 64 via inverter 76 and to the interrupt request signal at input 66 to provide a second priority signal at output 72 when an interrupt request signal is received from the second peripheral device in the absence of an interrupt request signal from the first peripheral device. In addition, the priority encoder includes a second AND gate 82 responsive to the inverted interrupt request signals from inputs 64 and 66 via inverters 76 and 78, respectively, and to the interrupt request signal at input 68 to produce a third priority signal at output 74 when an interrupt request signal is received from the third peripheral device in the absence of interrupt request signals from the first and second peripheral devices.

With a high or binary "1" interrupt request signal applied at input 64, a high or binary "1" priority signal appears at output 70 of priority encoder 62. Simultaneously, AND gates 80 and 82 are inhibited by the inverted signal from inverter 76 to produce low or binary "0" signals at outputs 72 and 74, respectively, regardless of the levels of the interrupt request signals applied at inputs 66 and 68. Thus, the first priority signal at output 70 represents the highest priority peripheral unit to be serviced. With a low or binary "0" signal applied to input 64, inverter 76 applies enabling signals to AND gates 80 and 82. With a high or binary "1" interrupt request signal applied to input 66, AND gate 80 is operated to provide a high or binary "1" priority signal at output 72, while AND gate 82 is inhibited by the inverted signal from inverter 78 to produce a low or binary "0" signal at output 74 regardless of the level of the interrupt request signal at input 68. Thus, the second priority signal produced at output 72 represents a peripheral device of intermediate priority to be serviced. With binary "0" signals applied at inputs 64 and 68, enabling signals are applied to AND gate 82 via inverters 76 and 78 while AND gate 80 is inhibited. If a high or binary "1" interrupt request signal is applied at input 68, AND gate 82 is actuated to produce a high or binary "1" priority signal at output 74. Thus, the third priority signal at output 74 represents the lowest priority peripheral unit to be serviced.

Referring to FIG. 3, one embodiment of read only memory 30 is a mask programmable ROM for storing interrupt address jump vectors. For example, the arrangement illustrated in FIG. 3 is comprised of a twelve bit address which is equal in its number of bits to the length of the program counter. For this example, ROM 30 is shown to be comprised of a three-by-twelve matrix including a set of three input lines 86 coupled to outputs 70, 72 and 74, respectively, of the priority encoder and a set of twelve output lines 88 coupled to connector bus 32. Each of the twelve output lines 88 is coupled by a bias resistor 90 to a common source of voltage $V_{DD}$. The three input lines and twelve output lines of the read only memory define a matrix including thirty-six intersections which can be programmed to store binary information. As shown in FIGS. 3 and 4, the read only memory is programmed via a plurality of transistors 92 provided at the intersections of input lines 86 and output lines 88 of the matrix. The symbol "X" shown in FIG. 3 represents a programmed ROM bit comprising an intersection at which field effect transistor 92 has its gate electrode coupled to input line 86, its drain electrode coupled to output line 88, and its source electrode coupled to ground. The transistor functions as a switch which responds to the priority signal applied to input line 86 to ground output line 88 when a priority signal is present to produce a low or binary "0" signal on the output line. Normally, in the absence of a priority signal on input line 86, a high or binary "1" signal appears on output line 88. The interrupt ROM code for the interrupt address jump vectors is defined by the programmer and coded at the same time and in the same manner as the program ROM.

Referring to FIG. 1, the interrupt system further includes a control circuit including an OR gate 94 having a plurality of inputs coupled to the outputs of synchronizing flip-flops 56, 58 and 60 and its output coupled to a pair of OR gates 96 and 98 which operate program counter 20 and multiplex unit 22, respectively. Each of the OR gates 96 and 98 also has an input coupled to a CALL line 100 which is activated by the microcomputer when it is desired to perform a predetermined subroutine in the program. When an interrupt request signal is received from a peripheral device, OR gate 96 commands program counter 20 to transfer its contents into the computer memory to preserve the status of the current program. At the same time, OR gate 98 shifts multiplex unit 22 from instruction bus 24 to connector bus 32 to permit loading of an interrupt address jump vector from read only memory 30 into program counter 20 to allow the microcomputer to service the corresponding peripheral device.

In the operation of the priority interrupt system, read only memory 30 is initially programmed to define the interrupt address jump vectors corresponding to the routines programmed into the program ROM (not shown) for servicing of the peripheral devices by the microcomputer. During the performance of the program by the microcomputer, program counter 20 steps through the addresses of the program ROM (not shown) to generate the microcomputer instructions. When a peripheral device requires service by the microcomputer, an interrupt request signal, e.g., INT 2, is applied to AND gate 36 to set flip-flop 42 which is subsequently latched by the microcomputer. The output of flip-flop 40 is applied via AND gate 50 to synchronizing flip-flop 58 to produce an interrupt request signal at input 66 of priority encoder 62. If no other interrupt request signal of higher priority is present, priority encoder 62 produces a priority signal at its output 72 which is applied to read only memory 30 to select the interrupt address jump vector corresponding to the programmed routine for servicing the second peripheral device. The priority request signal provided by flip-flop 58 also operates OR gate 94 to activate OR gates 96 and 98 to instruct program counter 20 to transfer its contents into the microcomputer memory and to shift multiplex unit 22 into communication with connector bus 32 to transfer the interrupt address jump vector corresponding to the second peripheral device into the program counter. As a result, at the completion of the current program instruction, the microcomputer immediately services the second peripheral device. When the servicing of the second peripheral device is completed, the interrupt request signal from the peripheral device is terminated and program counter 20 is reloaded with the contents previously transferred out using bus 24. As a result, the microcomputer resumes its performance with the first step after the interrupt.

If two or more interrupt request signals are latched at the same time, priority encoder 62 determines the interrupt request signal of the highest priority and selects the corresponding interrupt address jump vector from read only memory 30 for transfer to program counter 20. After servicing of the peripheral unit with the highest priority, priority encoder 62 permits the peripheral device of the next highest priority to be serviced by the microcomputer prior to resumption of the interrupted program. Flip-flops 40, 42 and 44 latch the interrupt request signals from the peripheral devices while the corresponding interrupt address jump vectors are loaded in sequence from read only memory 30 into program counter 20 for servicing the peripheral devices on the predetermined priority basis. Only after all interrupt requests from the peripheral devices are serviced in accordance with the predetermined priority basis is the interrupted program resumed.

The present invention achieves a high speed interrupt system for a microcomputer which allows a plurality of peripheral devices to be serviced on a predetermined priority basis with a minimum of time delay. The required interrupt address jump vectors are preprogrammed into a read only memory and are immediately available for loading into the program counter in response to an interrupt request. As a result, only one CALL type instruction time is required for the microcomputer to initiate servicing of the peripheral device. Both the interrupt address jump vector ROM and the program ROM can be advantageously provided on a single IC chip.

Although a preferred embodiment of the interrupt system has been illustrated and described in the context of a microcomputer system for servicing three peripheral devices, it will be understood by persons skilled in the art that the system can be readily adapted to service a significantly larger number of peripheral devices. Thus, it is recognized that the components of the interrupt system including the input devices, priority encoder and read only memory can be modified to accommodate a large number of peripheral devices to be serviced by the microcomputer.

The invention in its broader aspects is not limited to the specific details shown and described, and modifications may be made in the details of the priority interrupt system without departing from the principles of the present invention.

I claim:

1. A priority interrupt system for a microcomputer having a program read only memory for storing service routines for servicing a plurality of peripheral devices, comprising:

program counter means for stepping through the addresses of the program read only memory in the microcomputer;

input means for receiving interrupt request signals from the peripheral devices indicating requests for access to the microcomputer;

read only memory means for storing interrupt address jump vectors corresponding to the service routines for servicing the peripheral devices;

priority encoder means responsive to said input means for producing priority signals to select interrupt address jump vectors from said read only memory means in accordance with a predetermined priority basis in response to the interrupt request signals from the peripheral devices;

control means responsive to said input means for transferring the contents of said program counter means into the microcomputer memory upon occurrence of an interrupt signal;

loading means responsive to said control means for loading the interrupt address jump vectors from said read only memory means into said program counter means to allow the microcomputer to immediately service the peripheral device requesting access to the computer; said input means further comprising: a first set of storage devices corresponding in number to the number of peripheral devices, for receiving and storing the interrupt request signals directly from different peripheral devices, and a means for latching at any selected time all said storage devices to store therein all the interrupt request signals present at said first set of storage devices while the corresponding interrupt address jump vectors are loaded in priority sequence into said program counter means to allow the peripheral devices requesting access to be serviced on the predetermined priority basis.

2. A priority interrupt system for a microcomputer having a program read only memory for storing service routines for servicing a plurality of peripheral devices, comprising:

program counter means for stepping through the addresses of the program read only memory in the microcomputer;

input means for receiving interrupt request signals from the peripheral devices indicating requests for access to the microcomputer, said input means including a first set of storage devices corresponding in number to the number of peripheral devices and adapted to being coupled to a second set of storage devices for actuating a control means in response to an interrupt request signal; and enabling means coupling said first set of storage devices to a second set of storage devices to selectively enable and disable the transfer of the interrupt request signals from the first set of storage devices to said second set of storage devices;

read only memory means for storing interrupt address jump vectors corresponding to the service routines for servicing the peripheral devices;

priority encoder means responsive to said input means for producing priority signals to select interrupt address jump vectors from said read only memory means in accordance with a predetermined priority basis in response to the interrupt request signals from the peripheral devices;

control means responsive to said input means for transferring the contents of said program counter means into the microcomputer memory upon occurrence of an interrupt signal;

loading means responsive to said control means for loading the interrupt address jump vectors from said read only memory means into said program counter means to allow the microcomputer to immediately service the peripheral device requesting access to the computer;

a second set of storage devices corresponding in number to the number of peripheral devices coupled to said enabling means and responsive to the interrupt request signals from different peripheral devices; and means for latching at any selected time said sets of storage devices to store the interrupt request signals therein while the corresponding interrupt address jump vectors are loaded in sequence into said program counter means to allow the peripheral devices requesting access to be serviced on the predetermined priority basis.

3. A priority interrupt system for a microcomputer having a program read only memory for storing service routines for servicing a plurality of peripheral devices, comprising:

program counter means for stepping through the addresses of the program read-only memory in the microcomputer;

input means for receiving interrupt request signals from the peripheral devices indicating requests for access to the microcomputer, said input means including a first set of storage devices corresponding in number to the number of peripheral devices and adapted to being coupled to a second set of storage devices for actuating a control means in response to an interrupt request signal; and enabling means coupling said first set of storage devices to a second set of storage devices to selectively enable and disable the transfer of the interrupt request signals from the first set of storage devices to said second set of storage devices;

read-only memory means for storing interrupt address jump vectors corresponding to the service routines for servicing the peripheral devices;

priority encoder means responsive to said input means for producing priority signals to select interrupt address jump vectors from said read-only memory means in accordance with a predetermined priority basis in response to the interrupt request signals from the peripheral devices;

control means responsive to said input means for transferring the contents of said program counter means into the microcomputer memory upon occurrence of an interrupt signal;

multiplex means connected between the instruction bus of the microcomputer and said program counter means and operated by said control means in response to an interrupt request signal for coupling said read-only memory means to said program counter means to receive the corresponding interrupt address jump vectors therefrom;

a second set of storage devices corresponding in number to the number of peripheral devices coupled to said enabling means and responsive to the interrupt request signals from different peripheral devices; and means for latching at any selected time said sets of storage devices to store the interrupt request signals therein while the corresponding interrupt address jump vectors are loaded in sequence into said program counter means to allow the peripheral devices requesting access to be serviced on the predetermined priority basis.

* * * * *